United States Patent
Park et al.

(10) Patent No.: US 8,700,965 B2
(45) Date of Patent: Apr. 15, 2014

(54) APPARATUS AND METHOD FOR DETERMINING NUMBER OF RETRANSMISSIONS IN A WIRELESS SYSTEM

(75) Inventors: Sungki Park, Ashburn, VA (US);
Chunmei Liu, Great Falls, VA (US);
Masoud Olfat, Great Falls, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 390 days.

(21) Appl. No.: 13/049,310

(22) Filed: Mar. 16, 2011

(65) Prior Publication Data
US 2012/0239998 A1 Sep. 20, 2012

(51) Int. Cl.
*H04L 1/18* (2006.01)

(52) U.S. Cl.
USPC .......................... 714/748; 714/749; 714/751

(58) Field of Classification Search
USPC ....................... 714/748, 751, 749, 776, 775
See application file for complete search history.

(56) References Cited

U.S. PATENT DOCUMENTS

| | | | | |
|---|---|---|---|---|
| 8,121,084 | B2* | 2/2012 | Yoshida et al. | 370/329 |
| 8,341,842 | B2* | 1/2013 | Chen et al. | 29/890.04 |
| 8,423,854 | B2* | 4/2013 | Dinan et al. | 714/748 |
| 8,443,247 | B2* | 5/2013 | Duan et al. | 714/748 |
| 2008/0008135 | A1* | 1/2008 | Saito et al. | 370/335 |
| 2010/0083067 | A1* | 4/2010 | Fujimoto et al. | 714/748 |
| 2010/0122135 | A1* | 5/2010 | Lida et al. | 714/748 |
| 2011/0134829 | A1* | 6/2011 | Chen et al. | 370/328 |

* cited by examiner

*Primary Examiner* — Fritz Alphonse

(57) ABSTRACT

An apparatus and method of configuring a number of retransmissions for an automatic repeat request (ARQ) scheme (e.g., hybrid ARQ) includes configuring one or more first maximum retransmission numbers based on respective one or more first predetermined values and independent of a second maximum retransmission number. The first maximum retransmission numbers may indicate a maximum number of retransmissions related to respective service flows operational with the base station. The second maximum retransmission number may indicate a maximum number of retransmissions related to control messages transmitted in the wireless network, and may be configured based on a second predetermined value. The configuration of the first maximum retransmission numbers may include the maximum retransmissions numbers associated with a specific user in communication with the base station. Further, at least one of the first maximum retransmission numbers of a particular user may be reconfigured to a third predetermined value.

45 Claims, 7 Drawing Sheets

APPARATUS AND METHOD FOR DETERMINING NUMBER OF RETRANSMISSIONS IN A WIRELESS SYSTEM

BACKGROUND

This disclosure is generally related to high speed wireless networks and devices. In particular, this disclosure is related to configuration of a maximum retransmission number for an automatic repeat request (ARQ) scheme, e.g., hybrid ARQ (HARQ), implemented in wireless networks, e.g., third generation ("3G") or fourth generation ("4G") networks. Examples of 3G networks include networks operating on wireless technologies such as Code Division Multiple Access (CDMA) and Evolution-Data Optimized or Evolution-Data only ("EvDO")/CDMA. Examples of 4G networks include networks operating on wireless technologies include Worldwide Interoperability for Microwave Access ("WiMAX") technologies and Long Term Evolution (LTE) technologies.

Manual selective implementation of a well-known error control technique for data transmission, Automatic repeat-request (ARQ), utilizes acknowledgments and timeouts to achieve reliable data transmission. ARQ acknowledgments are messages sent by the receiver to the transmitter to indicate that the receiver correctly received an information unit. Timeouts are reasonable points in time after the sender transmits the information unit. The sender usually re-transmits the information unit if it does not receive an acknowledgment before the timeout. It continues to re-transmit the information unit until it either receives an acknowledgment from the receiver or exceeds a predefined number of re-transmission attempts. Conventional types of ARQ protocols include "stop-and-wait ARQ", "go-back-N ARQ" and "selective repeat ARQ". These protocols typically reside in the Data Link or Transport Layer 2 of the OSI 7-layer model.

Conventional Hybrid ARQ (HARQ) is a commonly used extension of the ARQ error control method that exhibits better performance, particularly over wireless channels. HARQ is used in several conventional wireless communications systems including High-Speed Downlink Packet Access (HSDPA) and High-Speed Uplink Packet Access (HSUPA) (i.e., third generation mobile telephony communications protocols in the High-Speed Packet Access (HSPA) family) which allow networks based on Universal Mobile Telecommunications System (UMTS) to have higher data transfer speeds and capacity on downlink and uplink, respectively, for mobile phone networks using the UMTS.

HARQ has also been used in the IEEE 802.16-2009 standard for WiMAX, and in LTE standard. Presently, HARQ provides an important technology for increasing data transmission reliability and data throughput in mobile communication systems. Specifically, in the WiMAX implementation, HARQ refers to a combination of ARQ and PHY layer reception techniques like Forward Error Correction (FEC) and signal combining techniques. Different from ARQ operating solely at the MAC layer, HARQ allows the receiver to perform soft-combining of retransmitted packets and therefore may provide some measure of improvement in spectral efficiency.

In current standards, e.g., in IEEE 802.16-2009 standard, the value for maximum number of retransmissions for HARQ is the same for all service flows and media access control (MAC) management messages, and is set statically, i.e., not changed dynamically, e.g., during a communication session. However, service flows and MAC management messages may have different Quality of Service (QoS) requirements, e.g., in terms of different delay and packet loss requirements. For example, a Voice over IP (VoIP) application is typically delay-sensitive but loss-tolerant, while a TCP flow application is delay-tolerant but loss-sensitive, and MAC management messages are both delay-sensitive and loss-sensitive. Accordingly, assigning a same value to the maximum number of retransmissions for HARQ for all service flows and MAC management messages may not align well with different QoS requirements, and thus, the advantage of using the HARQ scheme may not be fully maximized.

What is therefore needed is a solution to differentiate a maximum number of retransmissions assigned for service flows and a maximum retransmission number assigned for MAC management messages. What is further needed is a solution to reconfigure the maximum number of retransmissions related to one or more service flows for a specific user, e.g., based on QoS requirements of those one or more service flows, current channel conditions experienced by the user, etc.

SUMMARY

The apparatus and method of this disclosure provide various features, functions, and capabilities as discussed more fully in the detailed description. For example, this disclosure provides a novel and useful apparatus and method for use in a communications system, with particular application in wireless telecommunication systems such as those adhering to IEEE 802.16 (Wireless Metropolitan Area Networks—WMAN), IEEE 802.16-2009 (fixed and mobile WiMAX), 3rd Generation Partnership Project (3GPP) Releases 8 and 9, and LTE-Advanced communication standard specifications and/or communication standards for CDMA, EvDO, WiMAX, and LTE. However, this disclosure is not necessarily limited to use with such systems and methods. Also, the various embodiments disclosed herein generally may be realized by software enhancements to already existing base stations without requiring hardware modifications.

In one or more embodiments, this disclosure is directed to an apparatus and method useful for configuring a number (e.g., a maximum number) of retransmissions for an automatic repeat request (ARQ) scheme implemented in wireless networks, for example, 3G and 4G wireless networks, or other networks supporting multiple access scheme such as Orthogonal Frequency Division Multiple Access (OFDMA). Generally, the techniques and systems for configuring (or setting) a number of retransmissions for an ARQ scheme described herein relate to configuring maximum number of retransmissions related to one or more service flows operational with a base station (of the wireless network) independent of a maximum number of retransmissions related to control messages associated with the base station, or in general, transmitted in the wireless network. Further, the techniques and systems described herein relate to dynamically configuring or reconfiguring maximum number of retransmissions related to the service flows on per user (in communication with the base station) per service flow basis. In some embodiments, the techniques described herein may be implemented within or in association with a processor or a configuration module of the base station of the wireless network.

In one embodiment, a method of configuring a number of retransmissions for an ARQ (e.g., a hybrid ARQ (HARM)) scheme implemented in a wireless network includes configuring, using a processor operatively associated with a base station, one or more first maximum retransmission numbers based on respective one or more first predetermined values and independent of a second maximum retransmission number. The one or more first maximum retransmission numbers may indicate a maximum number of retransmissions related to respective one or more service flows operational with the base station. The second maximum retransmission number may indicate a maximum number of retransmissions related to control messages (e.g., media access control (MAC) management messages) of the wireless network. The method may further include configuring, using the processor, the second maximum retransmission number based on a second predetermined value.

In some embodiments, at least one of the one or more first maximum retransmission numbers or the second maximum retransmission number is configured as part of an uplink configuration of the wireless network, a downlink configuration of the wireless network, or both. The second maximum retransmission number, upon configuration, may remain static at least during a communication session between a user and the base station. In some embodiments, at least one of the one or more first maximum retransmission numbers or the second maximum retransmission number is configured within a configuration message associated with the base station. Such configuration within the configuration message may include configuring the maximum retransmission number(s) in a bit-map format.

In one or more embodiments, the method further includes reconfiguring at least one of the one or more first maximum retransmission numbers of a particular associated user (that is in communication with the base station) to a third predetermined value. The reconfiguration of the at least one first maximum retransmission number may be based on a dynamic configuration message received at or transmitted from the base station. The dynamic configuration message may include the third predetermined value. In some embodiments, at least one of the one or more first predetermined values or the third predetermined value is associated with a Quality of Service (QoS) requirement for a particular application type that may include one or more of a delay-constrained application, an application having a minimum data rate requirement, or an application having a minimum jitter requirement.

Further, in some embodiments, the configuration of the one or more first maximum retransmission numbers includes configuring those maximum retransmissions numbers associated with a specific associated user that is in communication with the base station. The one or more first maximum retransmission numbers (related to respective one or more service flows) of the associated user may be configured based on one or more dynamic configuration messages. A dynamic configuration message may be part of a request to configure a maximum retransmission number for a specific service flow operational between a specific user and the base station. The dynamic configuration message may be received at the base station (from the specific user), if the request to configure the maximum retransmission number is user-initiated. Alternatively, the dynamic configuration message may be transmitted from the base station (to the specific user), if the request to configure the maximum retransmission number is initiated by the base station.

In another embodiment, an apparatus capable of or adapted to configure a number of retransmissions for an automatic repeat request scheme implemented in a wireless network includes a transceiver, a memory device, and a processor. The transceiver may be configured to transmit and receive data over the wireless network. The memory device may be configured to store one or more predetermined values. The processor may be operatively coupled to the memory device and the transceiver, and may be arranged or adapted to configure one or more first maximum retransmission numbers based on respective one or more first predetermined values and independent of a second maximum retransmission number. The one or more first maximum retransmission numbers may indicate a maximum number of retransmissions related to respective one or more service flows operational with the base station. The second maximum retransmission number may indicate a maximum number of retransmissions related to control messages transmitted in the wireless network. The processor may be further arranged to configure the second maximum retransmission number based on a second predetermined value.

In some embodiments, the processor is further arranged to reconfigure at least one of the one or more first maximum retransmission numbers (e.g., related to respective one or more service flows) of an associated user to a third predetermined value. The associated user, in operation, is in communication with the transceiver.

In some embodiments, the processor is further arranged to configure the one or more first maximum retransmission numbers for a particular associated user (that is in communication with the base station).

In another embodiment, a non-transitory computer-readable medium comprising computer readable code physically embodied thereon which, when executed by a processor arranged in a first base station apparatus capable of operating in a wireless network, causes the processor to carry out the operations of configuring, using a processor operatively associated with a base station, one or more first maximum retransmission numbers based on respective one or more first predetermined values and independent of a second maximum retransmission number. The one or more first maximum retransmission numbers may indicate a maximum number of retransmissions related to respective one or more service flows operational with the base station. The second maximum retransmission number may indicate a maximum number of retransmissions related to control messages transmitted in the wireless network. The computer-readable medium may further include computer-readable instructions that, when executed, cause the processor to carry out the functions of configuring the second maximum retransmission number based on a second predetermined value.

In some embodiments, the computer-readable medium further includes computer-readable instructions that, when executed, cause the processor to carry out the functions of reconfiguring at least one of the one or more first maximum retransmission numbers of an associated user to a third predetermined value. The associated user, in operation, is in communication with the transceiver.

In some embodiments, the function of configuring includes configuring the one or more first maximum retransmission numbers for a specific associated user that is in communication with the base station.

In another embodiment, a memory for storing data for access by an application program being executed by a processor arranged in a base station capable of operating in wireless network includes a data structure that includes information related to uplink configuration or downlink configuration of the base station and accessed by the application program. In some embodiments, at least a part of the data structure is arranged in a bit-map format such that at least a first bit of the part of the data structure is configured based on a first predetermined value to indicate a maximum number of retransmissions related to a service flow operational with the base station. Further, at least a second bit of the part of the data structure is configured based on a second predetermined value to indicate a maximum number of retransmissions related to control messages transmitted in the wireless network.

BRIEF DISCUSSION OF THE DRAWINGS

FIG. 1 provides an illustration of a wireless network in which the inventive concept disclosed herein may be employed;

FIG. 2 provides a block diagram of an exemplary embodiment of a base station;

Figure 6:
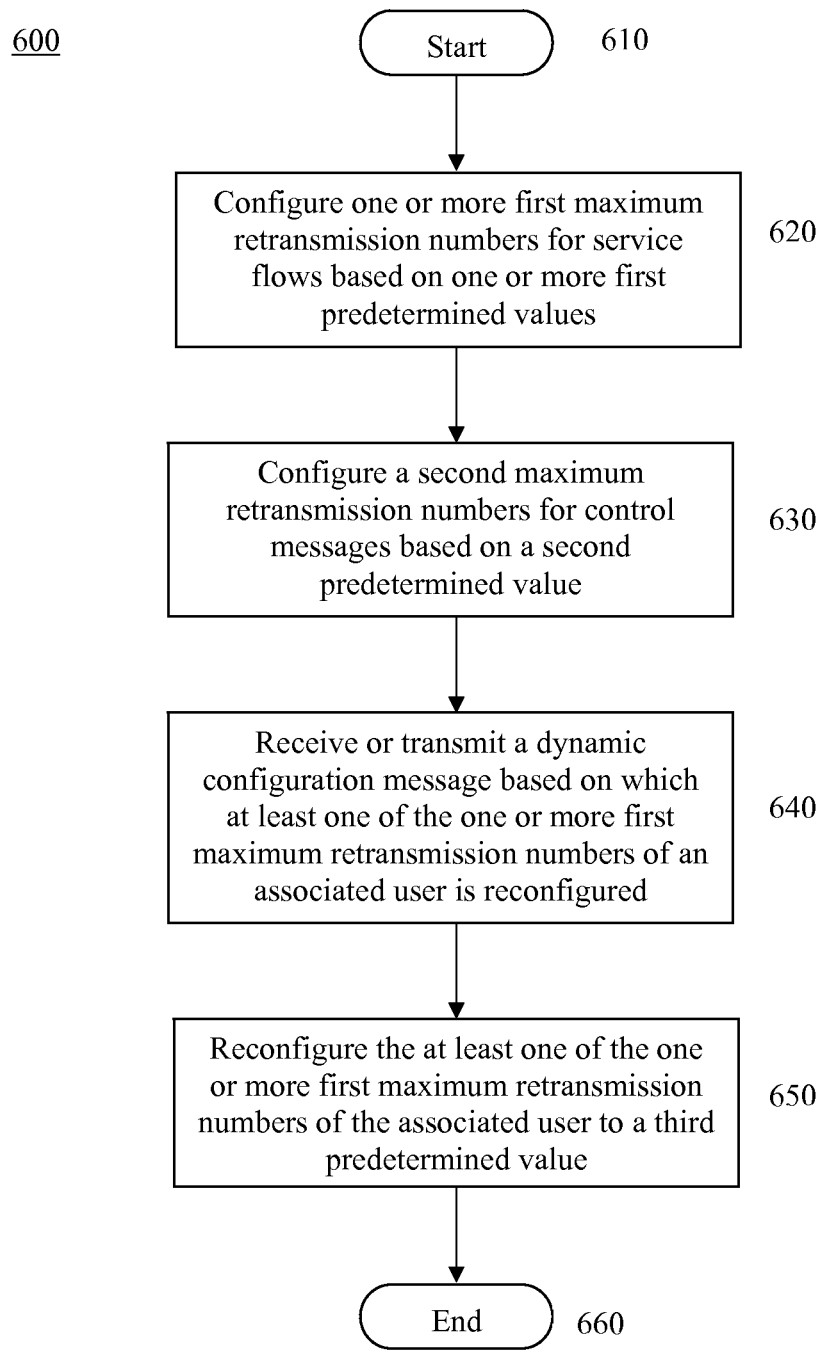
Figure 7:
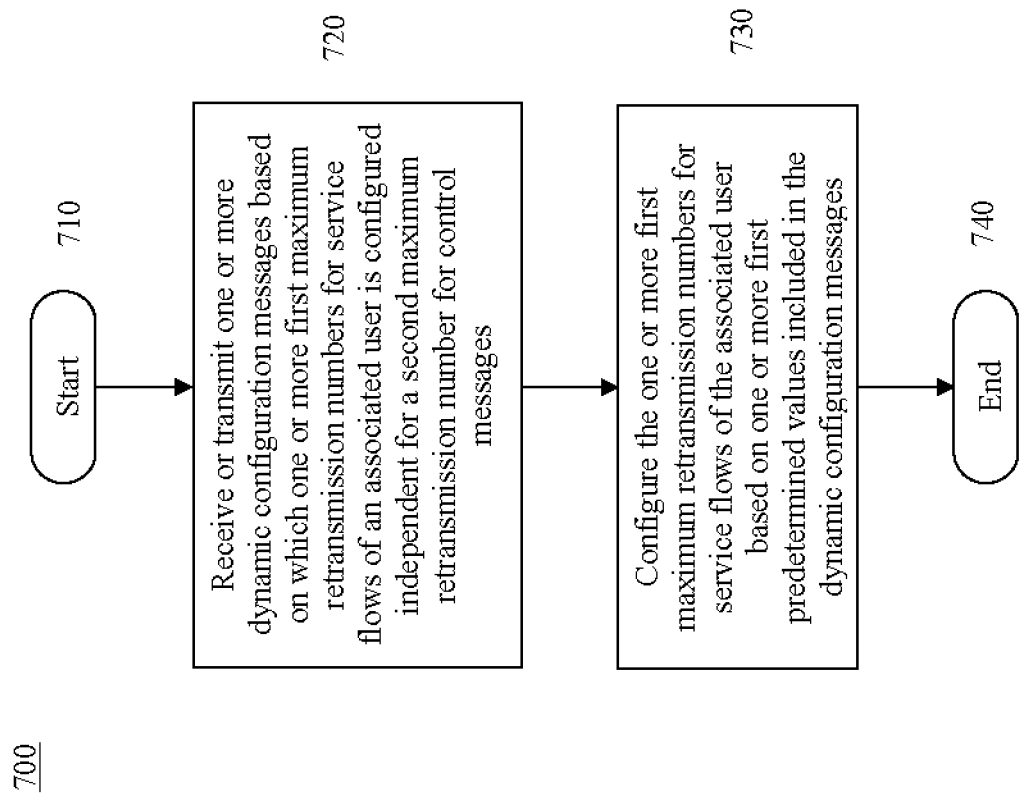

FIG. 6 provides an exemplary flowchart of a method of an embodiment of this disclosure; and FIG. 7 provides an exemplary flowchart of another method of an embodiment of this disclosure.

DETAILED DESCRIPTION

In the discussion of various embodiments and aspects of the apparatus and method of this disclosure, examples of a processor may include any one or more of, for instance, a personal computer, portable computer, personal digital assistant (PDA), workstation, web-enabled mobile phone, WAP device, web-to-voice device, or other device. Further, examples of multimode or dual mode 3G/4G devices, e.g., CDMA EvDO/WiMAX or CDMA EvDO/LTE devices may include wireless phone handsets, smart phones, modems, laptop computers with embedded dual-mode functionality, mobile Internet devices such as used for video streaming, and other User Equipment (UE), for example.

Those with skill in the art will appreciate that the inventive concept described herein may work with various system configurations. In addition, various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device, or a signal transmission medium), and may include a machine-readable transmission medium or a machine-readable storage medium. For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Figure 1:
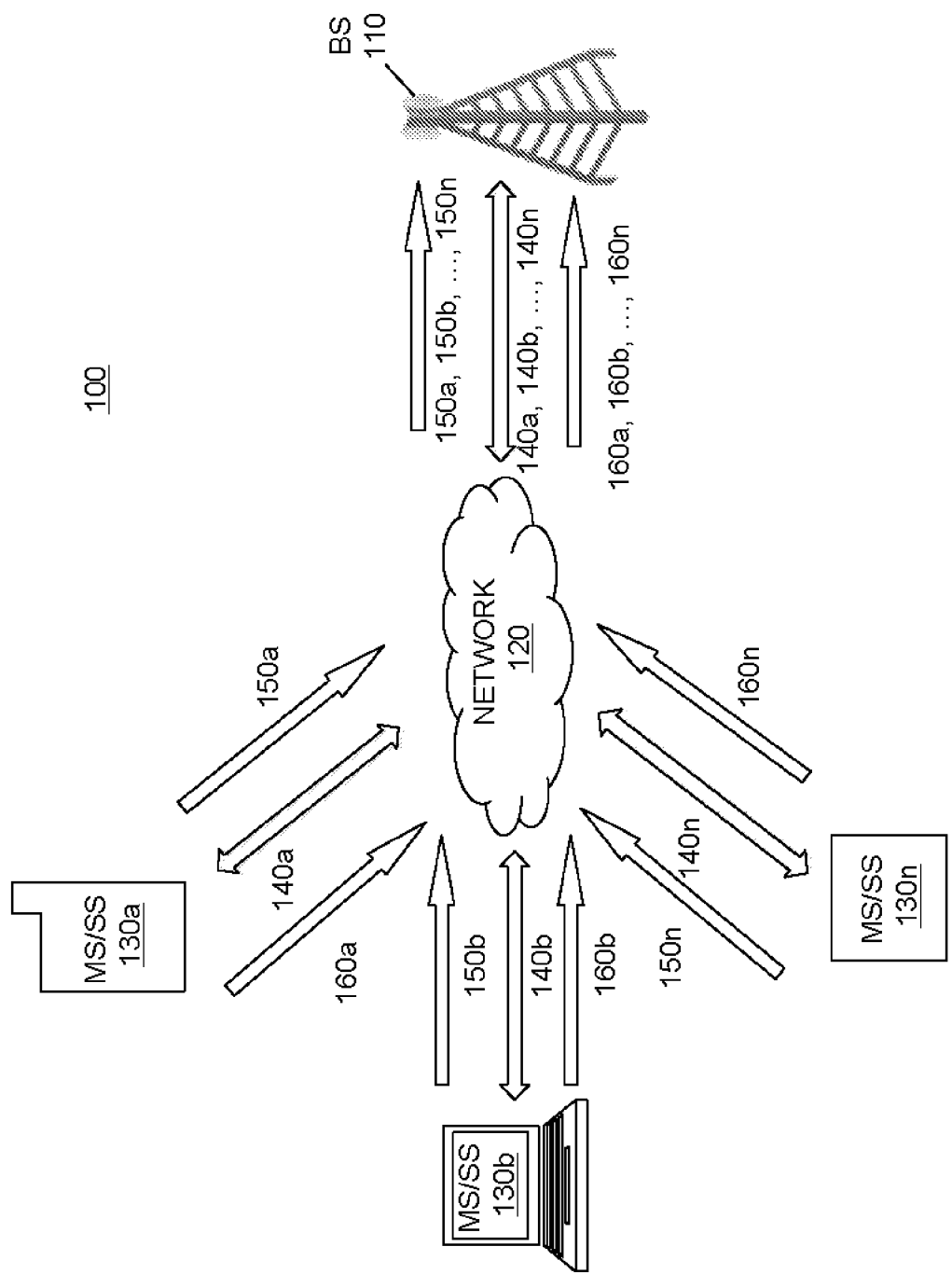

FIG. 1 depicts the architecture of an exemplary wireless network, e.g., a WiMAX network implemented in accordance with various aspects of IEEE Standard 802.16e, or any other 3G or 4G wireless network. In FIG. 1, BS 110 may communicate with one or more Mobile Stations/Subscriber Stations (MS/SS) 130a-130n over network 120 via an associated communication channel or carrier 140a-140n. The terms "SS" and "MS" may be used interchangeably, although it is recognized that MS implies the use of mobility enhancements. In some embodiments, as part of the wireless network shown in FIG. 1, a variety of 4G base stations with associated 4G coverage areas, e.g., WiMAX or LTE coverage areas, and 3G base stations with associated 3G coverage areas (not shown) may be (geographically) neighboring BS 110 and communicating with a plurality of users on same or different frequencies as carriers 140a-140n. Various factors such as the existence of ambient interference around the SS or BS, movement of the SS, and other factors may degrade or otherwise alter the channel condition of the communication channel, making the use of error detection and correction using, e.g., hybrid automatic repeat request (HARQ) desirable to ensure reliable communications over channels 140a-140n. HARQ uplink Acknowledgement Channels (ACKCH) 150a-150n allow each MS/SS 130a-130n to acknowledge packet receipt to BS 110 by use of a HARQ signal transmission over a dedicated HARQ ACK channel. Channel Quality Indicator (CQI) channels 160a-160n provide a path for the MS or SS to identify the relative quality of the communication channel to BS 110 using known techniques.

MS/SS 130a-130n may be relatively fixed or immobile terminal equipment, or may be equipment that includes the mobility functions of a MS, e.g., a cell phone or laptop computer traveling in an automobile or airplane. Also, although not specifically illustrated, it should be understood that, in various embodiments, one or more of MS/SS 130a-130n are configured to operate in accordance with WiMAX or LTE standards, i.e., 4G standards, or CDMA/EvDO, i.e., 3G standards, and may include a transceiver operatively coupled with one or more antennas, one or more processors, a baseband processing module, a parameter-monitoring module, memory, input/output controller, and other peripherals which may be used to carry out some or all of the functionality described herein.

The processor(s) may be configured to execute various functionality associated with processing of information received and/or transmitted from the antennas including, but not limited to, processing data packets received from the associated base station and periodic channel quality reports for the base station. The baseband processing module, e.g., operatively connected with the processor(s), may be configured to convert radio frequency (RF) signals from the associated base station to baseband signals. The parameter monitoring module may provide values of one or more operational parameters, e.g. power, of the mobile device. The memory may be configured to store various data and program instructions, e.g., data packets or frames, monitored operational-parameter values, etc. The input/output controller may operate in conjunction with a user interface of the device to allow display of information to a user, for example, as well as to receive input from the user using conventional input/output devices, among other purposes. If one or more MS/SS 130a-130n is a dual-mode/multimode device, e.g. configured to operate in both 3G EvDO/HSPA and 4G WiMAX/LTE modes, the device may include an additional 3G transceiver which, along with the 4G transceiver, supports the communication in both 3G and 4G modes. One or more of these wireless devices may be pre-provisioned with an optional GPS receiver which may be used in various ways well known to a person of ordinary skill in the art.

In some embodiments, MS/SS 130a-130n may communicate with BS 110 over respective carrier channels 140a-140n may be in communication with BS 110 for a variety of service flows, e.g., voice service flows (e.g., Voice over IP) and data services such as real-time and non-real time multimedia services. Depending on the type of service flow, BS 110, or a module therein, may allocate a particular amount of bandwidth (e.g., in terms of number of time slots) on the carrier used by MS/SS 130a-130n, a particular modulation coding scheme (MCS) chosen from a plurality MCS options, or both to support the service flow operational with MS/SS 130a-130n.

Apart from managing ample bandwidth to support different services flows, wireless systems, e.g., WiMAX systems, present various configuration challenges including challenges to adapt (i.e., initially set and reset) system configurations (e.g., maximum retransmission number for a HARQ scheme) in accordance with type of service flows (e.g. each with a specific QoS requirement), and independent of the (standard or user-defined) configuration for control messages of the wireless network. Furthermore, the quality of the wireless channel is typically different for different users and randomly changes with time (on both slow and fast time scales). Accordingly, the amount of interference and packet error rates experienced by each user may be different. As such, depending on the QoS requirement for a particular application type (associated with a specific service flow) and current channel conditions, the maximum retransmission number for the HARQ scheme for that particular application or service flow may be dynamically reconfigured. The reconfiguration of the retransmission number for the specific service flow of the particular associated user may be initiated by that user (associated with MS/SS 130a-130n) or by BS 110.

To support multimedia applications, various wireless standards define different types of service flows to categorize user services and accordingly provide resources. For example, the WiMAX IEEE 802.16e standard defines five types of data delivery service flows for downlink (DL) flows and five corresponding scheduling services for uplink (UL) flows: UGS—Unsolicited Grant Service, with constant bit-rate services (CBR); rtPS—Real Time Polling Service, with variable bit-rate, but sensitive to delay; ertPS—Extended Real Time Polling Service, for VoIP with silence suppression, similar to CBR with gaps; nrtPS—Non-real Time Polling Service, time insensitive, but requiring a minimum bandwidth allocation; and BE—Best Effort. Uplink is differentiated from downlink because uplink flows (except UGS) involve some form of request/grant mechanism for resource allocations. Table I summarizes the various WiMAX QoS types.

TABLE I

WiMAX Data Delivery Services

| | QoS | Targeted traffic |
|---|---|---|
| Unsolicited grant service (UGS) | Unsolicited grant service (UGS) | Constant bit rate (CBR) services, TDM services |
| Extended real-time Variable Rate (ERT-VR) | Extended real-time polled service (ertPS) | VoIP with silence suppression/activity detection |
| Real-time Variable Rate (RT-VR) | Real-time polled service (rtPS) | Streaming audio & video |
| Non-real-time Variable Rate (NRT-VR) | Non-real-time polled service (nrtPS) | File transfers |
| Best Effort (BE) | Best Effort (BE) | Web browsing, e-mail, etc. |

Each of these service flow types has a different QoS requirements and is designed to support different types of traffic streams. The order of priority given to services while transmitting is generally as follows: UGS>ertPS>rtPS>nrtPS>BE. However, the particular scheduling mechanism is generally left to be defined by proprietary implementations. Other 4G standards, e.g., LTE standard, have analogous user service types (or QoS requirements) and their defined prioritization. For example, for LTE standard, Table II provides is a list of various service type with their respective QoS class identifiers (QCI):

TABLE II

Service Flows/QCI

| QCI | Service Type |
|---|---|
| 1 | Guaranteed Bit Rate (GBR), Conversational Voice |
| 2 | GBR, Conversational Video (live streaming) |
| 3 | GBR, Non-conversational Video (buffered streaming) |
| 4 | GBR, Real-time Gaming |
| 5 | Non-GBR, IMS Signaling |
| 6 | Non-GBR, Voice, Video (Live Streaming), Interactive Gaming |
| 7 | Non-GBR, Video (buffered streaming) |
| 8 | Non-GBR, TCP-based (e.g., WWW, e-mail) chat, FTP, p2p file sharing |
| 9 | Non-GBR |

Since the BS governs resource scheduling, uplink resources must either be allocated automatically on a periodic basis, or requested individually as needed by the MS. Resources for UGS and ertPS service flows are periodically allocated according to an unsolicited grant interval (UGI) defined for each service flow. The ertPS service flows can also dynamically request additional resources, i.e., more throughput, as described below. Resources for rtPS, nrtPS and BE service flows must be individually requested (usually triggered by data in the MS buffer.) The BS can automatically offer dedicated uplink opportunities for specific ertPS, rtPS and nrtPS service flows to request bandwidth on a periodic basis (unsolicited polling interval). The ertPS, rtPS, nrtPS and BE service flows can also request bandwidth during a shared uplink opportunity, subject to contention. Once UL resources have been granted, requests for additional UL resources can be "piggybacked" on existing allocations.

Referring to FIG. 1, BS 110 may be serving MS/SS 130a-130n each with one or more types of service flows (UGS, ertPS, rtPS, nrtPS, BE) using an associated carrier 140a-140n. As discussed above, different service flows may be associated with different application types each having a specific QoS requirement. For example, VoIP application, e.g., associated with ertPS service flow, may have a QoS requirement related to constraint on acceptable amount of delay, packet loss, or both. VoIP application may be considered delay-sensitive, but loss-tolerant. Other applications, such as a TCP flow application may be consider loss-sensitive, but delay-tolerant. Similarly, QoS requirement for a video streaming application, e.g., associated with rtPS service flow, may include a constraint on minimum data rate, and QoS requirement for a multimedia playback application may include a minimum jitter constraint. Furthermore, network control or management messages, e.g., MAC management messages, may be considered both delay-sensitive and loss-sensitive. Accordingly, for wireless communication scenarios where channel conditions are such that transmissions (between BS 110 and MS/SS 130a-130n) are typically error-prone, and error correction and detection techniques, such as the HARQ process, are operational, the maximum number of retransmissions for service flows may be configured independent of the maximum number of retransmissions for control messages (such as MAC management messages).

In other words, instead of assigning a same HARQ maximum retransmission number for control messages as well as for all the service flows, the HARQ maximum retransmission numbers for service flows and control messages may be set separately. The maximum retransmission numbers may all be equal, each may be unique, or only some may be equal. Furthermore, after initially configuring the HARQ maximum number of retransmissions for service flows, depending upon current channel conditions and QoS requirement for a service flow or associated application, a user may request the base station to dynamically reconfigure the maximum retransmission number for at least one of its operational service flows to a new value. In one embodiment, the process of such dynamic reconfiguration for a particular user (and its one or more specific service flows) may be initiated by the base station instead of the user. In one embodiment, after initial configuration, the maximum number of retransmissions assigned for control messages (e.g., MAC management messages) may not be dynamically reconfigured, and thus, may remain static for at least one communication session between a user and the base station.

In one embodiment, the maximum number of HARQ retransmissions may not be initially configured independently for service flows and control messages, and instead, the (same) maximum number of retransmissions as defined in a standard, e.g., WiMAX or IEEE 802.16-2009, or LTE, may be assigned for all service flows and control messages. However, in such embodiment, depending upon current channel conditions and QoS requirement for a service flow, a user (or the base station) may generate a request to dynamically reconfigure the maximum retransmission number for at least one of the user's service flows to a new value, i.e., to a value different than the standard-defined maximum retransmission number.

Figure 2:
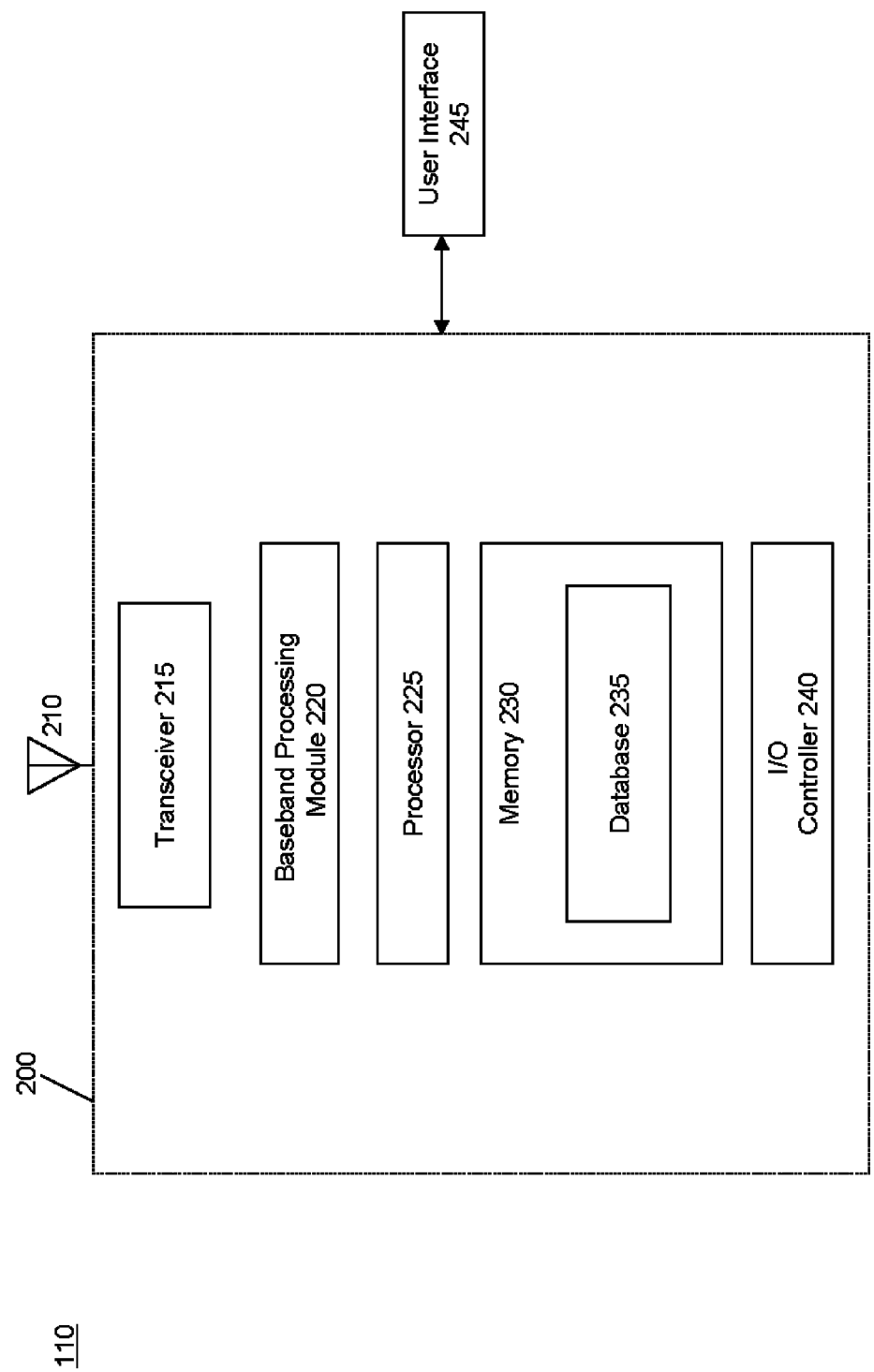

In some embodiments, techniques for configuring (and reconfiguring) the HARQ maximum retransmission numbers described herein are implemented in one or more components or modules of BS 110 to carry out some or all of the functions described herein. FIG. 2 shows an exemplary embodiment of apparatus 200, e.g., BS 110 configured, among other functions, for configuring (and reconfiguring) the HARQ maximum retransmission numbers. Details of structure and functionality of the illustrated base station's modules are discussed as follows.

Refer to FIG. 2, which shows an exemplary apparatus 200 depicting an embodiment of BS 110. As shown, apparatus 200 may include antennas 210, transceiver 215 operatively connected to antenna 210, baseband processing module 220, processor 225, memory module 230 including database 235, input/output (I/O) control module 240, and user interface 245. For clarity, resources and/or components of apparatus 200 not required for or associated with configurations related to the HARQ process are not shown in FIG. 2 or subsequent figures of this disclosure, but those resources/components will be appreciated by a person of ordinary skill in the art.

In one or more embodiments, one or more modules of the apparatus 200, or other components that the module may be connected with (not shown in figures) may include one or more processors and/or individual memory modules, to perform the functions and processes described herein. Also, although the modules in FIG. 2 are shown as individual components or elements, in one or more embodiments, those modules may be combined into one or more devices, one or more software programs, or one or more circuits on one or more chips. In some embodiments, some modules or components of apparatus 200 may be part of a system which is located geographically remotely from the rest of the modules or components of apparatus 200. In such a case, the remotely located groups of modules may be operatively connected with each other through a wired or wireless network (not shown) using necessary interfaces and components. Such network may include one or more of a private TCP/IP network, the Internet, or a private or public radio frequency (RF) network.

As would be understood by a person with skill in the art, the functional block diagram of FIG. 2 is presented merely an aid in understanding the various functions of apparatus 200, and actual implementation of the desired functionality may be implemented by fewer or more functional modules, implemented by software code operating on one or more processors.

Transceiver 215 may be operatively connected to antenna 210 to exchange data packets with one or more wireless devices, e.g., MS/SS 130a-130n, based on the wireless technology, e.g., WiMAX, LTE, or in general, any OFDMA-based wireless technology, implemented for network 100. Further, transceiver 215 may be coupled with or may include a baseband processing module 220 which may be configured to convert radio frequency (RF) signals received from transceiver 215 to baseband signals. Processor 225 may represent one or more processors configured to execute various functionality associated with processing of information received and/or transmitted from antennas 210, including processing of information related to configuration and dynamic reconfiguration of the maximum number of retransmissions of the HARQ scheme for service flows and control messages (e.g., MAC management messages) exchanged between BS 110 and MS/SS 130a-130n.

Memory 230 may be configured to store various data (e.g., as structured data in database 235) related to the HARQ process, e.g., configuration messages such as MAC management messages defined in the WiMAX standard, that the base station transmits to users defining various characteristics of the network. For example, in accordance with the WiMAX or IEEE 802.16-2009 standard, MAC management messages transmitted by BS 110 to MS/SS 130a-130n include, among other configuration messages, a downlink channel descriptor (DCD) message and an uplink channel descriptor (UCD) message. Both DCD and UCD messages may be transmitted by BS 110 at periodic intervals to define the characteristics of a downlink (DL) physical channel and an uplink (UL) physical channel, respectively. Furthermore, as defined in the IEEE 802.16-2009 standard, DCD and UCD messages both include configuration information such as HARQ configuration information in a Type-Length-Value (TLV) encoded format. For example, in the aforementioned standard, the maximum number of HARQ retransmissions for an UL physical channel is defined in "TLV 174" of the UCD message, which represents Type (of the configuration) as "174" with Length equal to one byte and (default) Value equal to maximum four retransmissions. Similarly, the maximum number of HARQ retransmissions for a DL physical channel is defined in "TLV20" of the DCD message, which represents Type as "20" with Length equal to one byte and (default) Value equal to maximum four retransmissions. These values for the maximum number of retransmissions (encoded, e.g., in TLV174 of UCD message and TLV 20 of DCD message) are set for, and are applicable to, transmissions relating all service flows supported by the base station (e.g., BS 110) and all MAC management messages transmitted by the base station (e.g., BS 110).

MAC management messages stored in memory 230 may also include ranging request (RNG-REQ) and ranging response (RNG-RSP) messages, registration request (REG-REQ) and registration response (REG-RSP) messages, SS basic capability request (SBC-REQ) and SBC response (SBC-RSP) messages, dynamic service addition request (DSA-REQ) and DSA response (DSA-RSP) messages, and dynamic service change request (DSC-REQ) and DSC response (DSC-RSP) messages. The functions and formats of each of these messages is defined in the IEEE 802.16-2009 standard. For example, a DSA-REQ message may be sent by BS 110 or MS/SS 130a-130n to create a new service flow, and DSA-RSP message is generated in response to the DSA-REQ message. The DSA-REQ (and DSA-RSP) message may include parameters (encoded as TLV tuples) related the new service flow, e.g., a new HARQ maximum retransmission number that is different than, and is meant to replace, the default value defined in the standard. Similarly, a DSC-REQ message may be sent by BS 110 or MS/SS 130a-130n to dynamically change parameters of an existing service flow, and DSC-RSP message is generated in response to the DSC-REQ message. The DSC-REQ (and DSC-RSP) message may include a new HARQ maximum retransmission number that is different than, and is meant to replace, the standard-defined default value or the retransmission number previously set, e.g., based on modified UCD and/or DCD messages (as discussed in detail below) or based on a DSA-REQ message.

In addition to the aforementioned configuration or control messages, memory 220 may store instructions related to techniques for configuring and reconfiguring values assigned for the maximum number of HARQ retransmissions relating one or more service flows and control messages (e.g., MAC management messages).

Input/output controller 240 may operate in conjunction with user interface 245 to allow display of information, e.g., to an operator of apparatus 200, as well as to receive input from the operator using conventional input/output devices, among other purposes.

In some embodiments, while in operation, processor 225 (operatively coupled to transceiver 215 and memory 230) is arranged to configure (or configures) maximum retransmission numbers for one or more service flows operational with transceiver 215, or in general, operational between BS 110 and MS/SS 130a-130n. Processor 225 may also configure a maximum retransmission number for control messages, e.g., MAC management messages of BS 110, independent of the maximum retransmission numbers for the service flows. In one embodiment, processor 225 may specify values for the maximum number of retransmissions for service flows and control messages in accordance with certain predetermined or operator-defined values in the UCD and DCD messages. As such, the maximum retransmission numbers specified by processor 225 modify or override the standard-defined maximum number of retransmissions for UL and DL channels in TLV174 of the UCD message and TLV20 of the DCD message, respectively.

In one embodiment, values for the maximum number of retransmissions for service flows and control messages are independently configured using predetermined values to align with a QoS requirement associated with each service flow or based on one or more transmission requirements of control messages. For example, for delay-sensitive but loss-tolerant service flows such as VoIP application, by setting a maximum retransmission number lower than the standard-defined value, delay and jitter may be reduced (albeit at the cost of potentially higher but insignificant packet loss rate). Similarly, for service flows, such as TCP flows, that have a QoS requirement of high reliability but are not delay-sensitive, by setting a maximum retransmission number higher than the standard-defined value, the performance gain obtained by using the HARQ process may be maximized.

Further, for control messages such as MAC management messages that require high reliability, by setting a maximum retransmission number higher than the standard-defined value, the performance gain of the HARQ process may be maximized.

In one embodiment, processor 225 may modify TLV174 of the UCD message and/or TLV20 of the DCD message in a bit-map format, such that each bit of the TLV174/TLV20 byte indicate or represent a predetermined value for the maximum number of retransmissions for a service flow or a MAC management message. For example, the TLV174/TLV20 byte may be modified as follows:

Bit 0: for MAC management messages; "0":4, "1":8;
Bit 1: for UGS; "0":2, "1":4;
Bit 2: for ertPS; "0":2, "1":4;
Bit 3: for rtPS; "0":2, "1":4;
Bit 4: for nrtPS; "0":4, "1":8;
Bit 5: for BE; "0":4, "1":8;
Bits 6-7: reserved.

Although, in the above example, only one bit is associated with each service flow type and with MAC management messages, thereby providing two options ("0" and "1") for predetermined values that can be associated with each bit, more than one bits may be used to represent the maximum retransmission number for one or more service flows or MAC management messages. Moreover, values other than those used in the example above (i.e., two, four and eight) may be associated with one or more bits of TLV174/TLV20. In general, TLV174, TLV20, or both may be modified in various ways, other than the one described in the above example, such that the maximum number of retransmissions related to service flows and the maximum number of retransmissions related to MAC management messages are independently configured in accordance with respective predetermined values.

Figure 3:
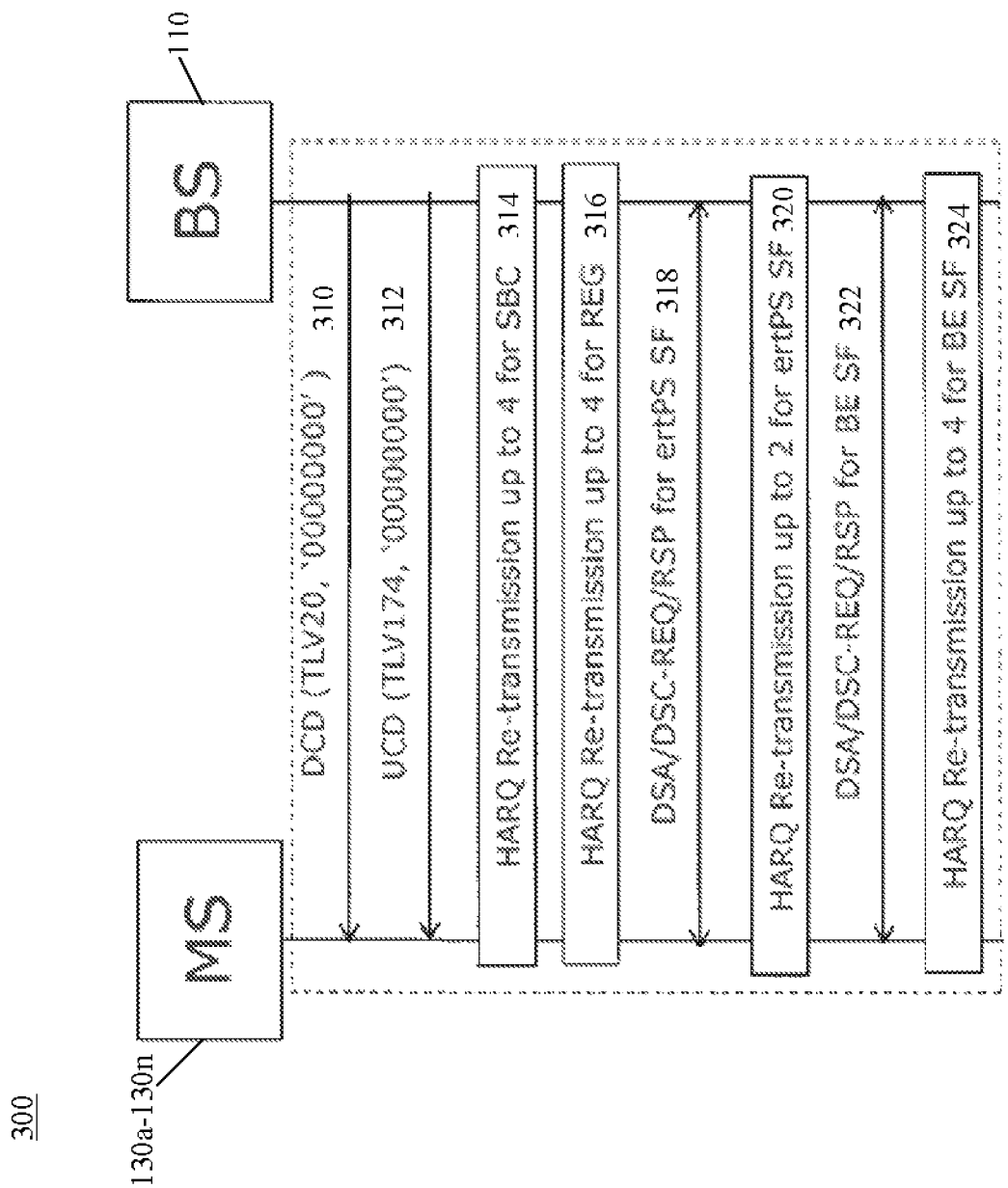
FIG. 3 illustrates an exemplary message exchange related to an embodiment of configuration of retransmission numbers for service flows and control messages.

FIG. 3 illustrates an exemplary message exchange 300, e.g., between BS 110 and one of MS/SS 130a-130n, related to the above-discussed independent retransmission number configurations for service flows and control messages. Initially, BS 110 may transmit DCD message 310 and UCD message 312 to MS 130, each of which include, among other channel configuration information, modified TLV174 and TLV20, respectively. As shown, TLV20 of DCD message 310 may be modified such that each bit of TLV20 is set to value "0," which, as discussed in the above example, may correspond to predetermined values, e.g., equal to two or four for service flows and MAC management messages, respectively. Similarly, each bit of TLV174 of UCD message 312 may be set, e.g., by processor 225, equal to "0," indicating the maximum retransmission number for service flows and MAC management messages based on predetermined values equal to two or four. Accordingly, labels 314 and 316 indicate that the HARQ maximum retransmission numbers for management messages, SBC and REG messages, are set equal to four corresponding to value "0" at bit 0 of TLV174/TLV20.

Further, message exchange 318 of DSA/DSC-REQ and DSA/DSC-RSP messages may be used to create or change a service flow (e.g., ertPS) between BS 110 and MS 130. Upon establishing or changing the ertPS service flow, as indicated by label 320, the HARQ maximum retransmission number for the ertPS service flow is set equal to two corresponding to value "0" at bit 2 of TLV174/TLV20. Similarly, message exchange 322 of DSA/DSC-REQ and DSA/DSC-RSP messages may be used to create or change BE service flow. Upon establishing or changing the BE service flow, as indicated by label 324, the HARQ maximum retransmission number for the BE service flow is set equal to four corresponding to value "0" at bit 5 of TLV174/TLV20.

In one embodiment, processor 225 may configure the maximum retransmission numbers such that those numbers, after initial setting in DCD and UCD messages, remain unchanged or static during one or more communication sessions between BS 110 and MS/SS 130a-130n. In other words, the initially-configured maximum retransmission number may not be further changed, e.g., as per current channel (or any other) conditions related to MS/SS 130a-130n. Accordingly, if messages 318, 322 are DSC messages, the service flow change indicated or requested in those messages may not correspond to changes in the maximum retransmission number, and instead relate to some other change(s) for the respective service flow.

In another embodiment, after initial setting of the maximum retransmission numbers using the UCD and DCD messages, processor 225 is capable of dynamically reconfiguring the maximum retransmission number for one or more service flows for a specific user, e.g., one of MS 130a-130n. A need for such reconfiguration may arise in accordance with current channel conditions experienced by the user, a QoS requirement (in terms of delay, packet loss, jitter, data rate, etc.) of a specific service flow operational with the user, or both. However, in this embodiment, the maximum retransmission number for MAC management messages may not be changed, i.e., remain static, after it is set in the UCD/DCD message.

Figure 4:
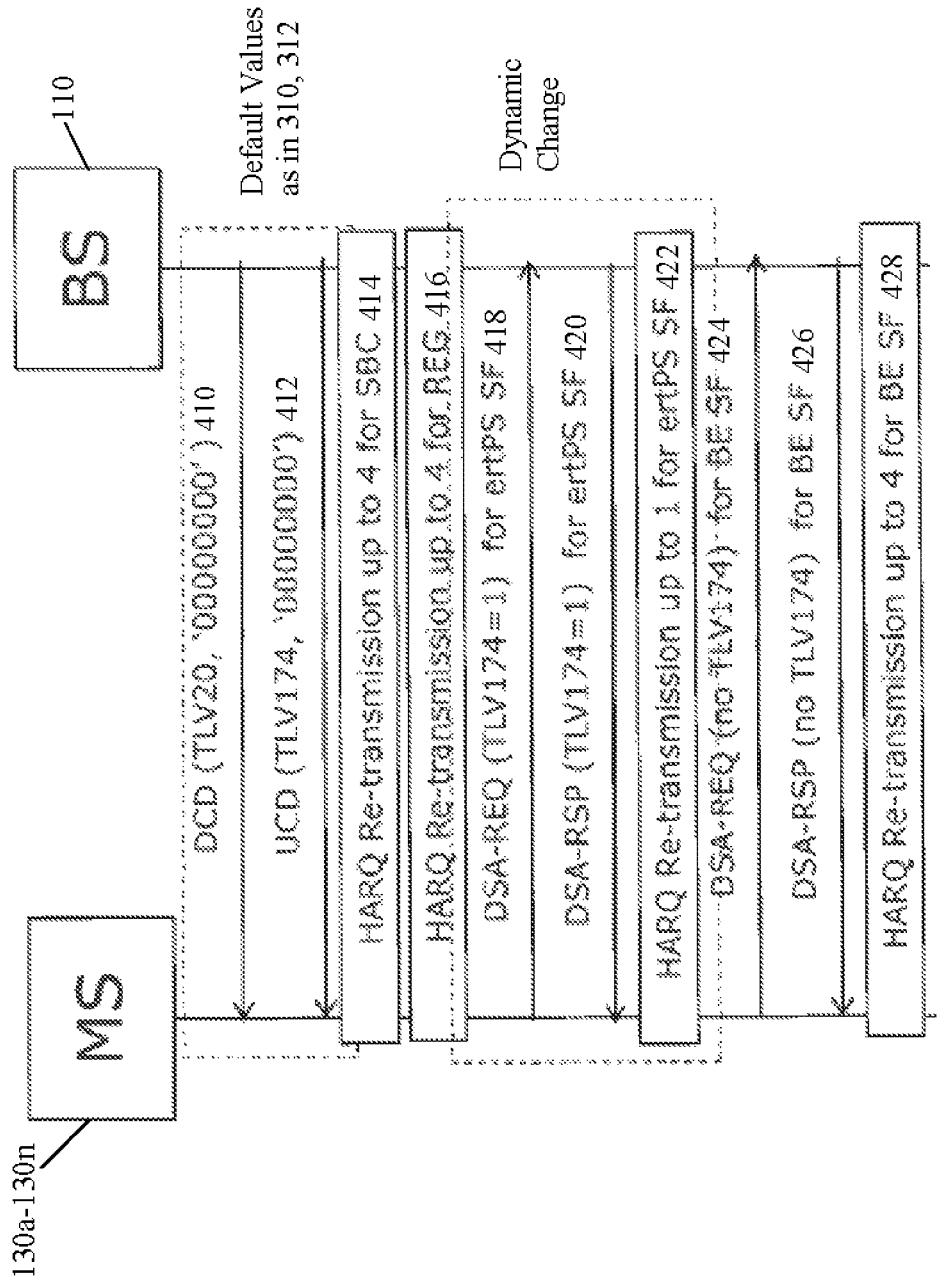
FIG. 4 illustrates an exemplary message exchange related to an embodiment of configuration of retransmission numbers for service flows and control messages and subsequent reconfiguration of retransmission numbers for service flows.

FIG. 4 illustrates an exemplary message exchange 400 for initial independent configurations of the maximum retransmission numbers for service flows and MAC management messages, and subsequent reconfiguration of the maximum retransmission number for one or more service flows. Initially, as also illustrated in FIG. 3, BS 110 may transmit DCD message 410 and UCD message 412 to MS 130, each of which include modified TLV174 and TLV20, respectively. As shown, TLV20 of DCD message 410 may be modified such that each bit of TLV20 is set to value "0," indicating predetermined values equal to two or four as the maximum retransmission number for service flows and MAC management messages in the DL channel. Similarly, each bit of TLV174 of UCD message 412 may be set equal to "0," indicating predetermined values equal to two or four as the maximum retransmission number for service flows and MAC management messages in the UL channel. Accordingly, labels 414 and 416 indicate that the HARQ maximum retransmission numbers for management messages, such as SBC and REG messages, are set equal to four corresponding to value "0" at bit 0 of TLV174/TLV20.

Further, MS 130 may transmit DSA-REQ message 418 to initiate creation of the ertPS service flow. In one embodiment, message 418 includes encoded parameter indicating a request to reconfigure the HARQ maximum retransmission number for the ertPS service flow for that MS 130 to a new value. As shown, message 418 includes the new value equal to one as the new retransmission number to be assigned to the ertPS service flow. Message 418 may be received at transceiver 215, and subsequently, processed by processor 225, such that TLV174 (e.g., stored in memory 230) is updated with the new value (e.g., equal to one as indicated by "TLV174=1") for the maximum retransmission number for the ertPS service flow of the associated MS 130. Upon reconfiguration, BS 110, via transceiver 215, may transmit DSA-RSP message 420 to MS 130 indicating that the new ertPS service flow has been created with the reconfigured maximum retransmission number equal to one (as referred to in label 422).

The exchange of messages 424, 426 between MS 130 and BS 110 with encoded parameter "no TLV174" may indicate a request and response to create a new BE service flow with no dynamic change in the maximum retransmission number for the BE service flow operational with MS 130. Accordingly, as shown in label 428, the maximum retransmission number for the BE service flow remains unchanged equal to four, as set in TLV174 of UCD message 412.

In one embodiment, the process of reconfiguring the maximum retransmission number of a specific service flow of a particular user (MS 130) may be initiated by BS 110, instead of MS 130. Accordingly, a dynamic configuration message may be transmitted from transceiver 215 to the user or MS 130 of which a service flow's retransmission number is to be changed. The dynamic configuration message from BS 110 may include the new value with which the service flow's maximum retransmission number is updated.

Figure 5:
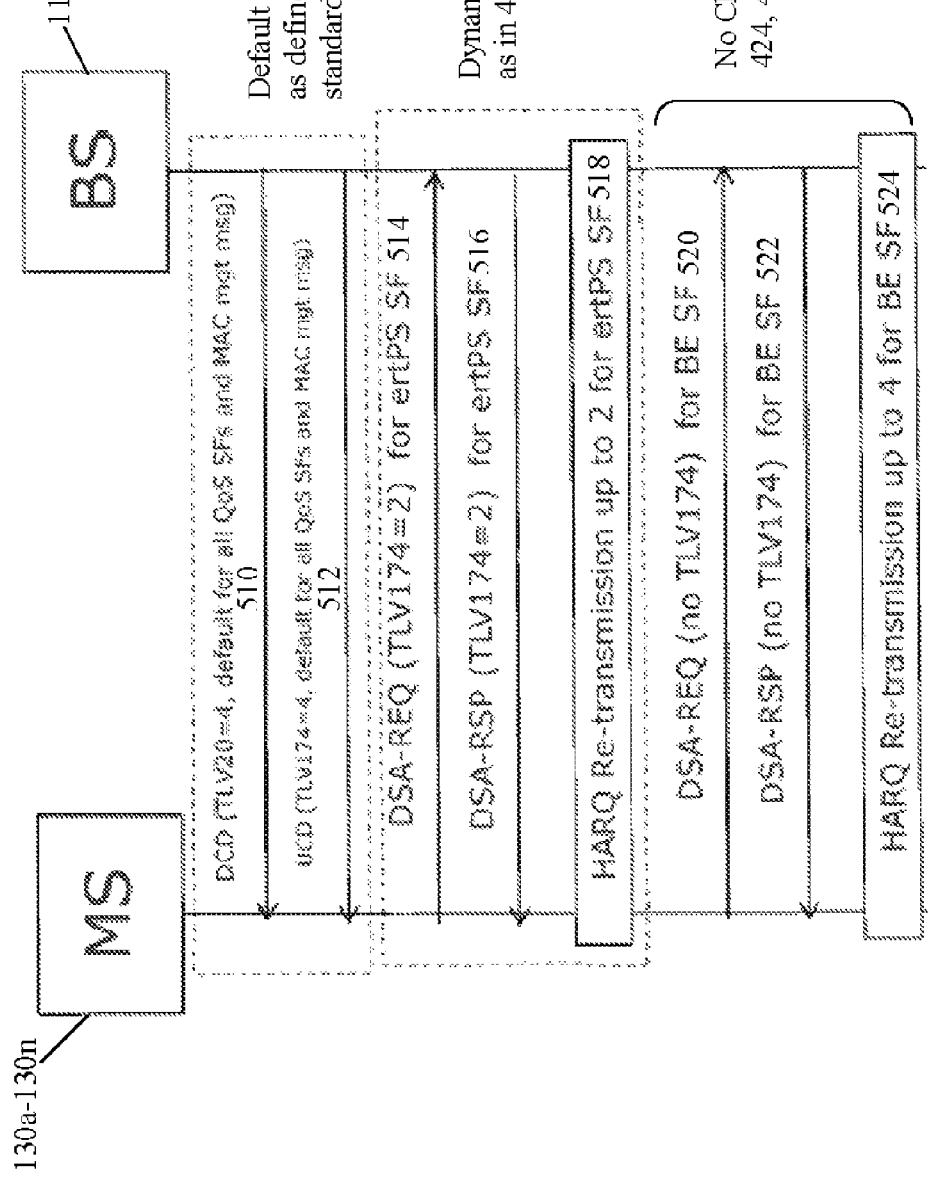
FIG. 5 illustrates an exemplary message exchange related to an embodiment of configuration of retransmission numbers for service flows for an associated user.

FIG. 5 illustrates another exemplary message exchange 500 for dynamic configuration of the maximum retransmission number for one or more service flows. In this embodiment, the maximum retransmission number for all service flows and MAC management messages is set equal to a single value as defined in the standard, e.g., IEEE 802.16-2009 standard. Accordingly, TLV20 in DCD message 510 and TLV174 in UCD message 512 (both transmitted from BS 110 to MS 130) remain unchanged, indicating the maximum retransmission number for all service flows and MAC management messages equal to four.

Further, MS 130 may transmit DSA-REQ message 514 to initiate creation of the ertPS service flow. In one embodiment, message 514 includes encoded parameter indicating a request to configure the HARQ maximum retransmission number for the ertPS service flow for that MS 130 to a new value, i.e., to a value different than the standard-defined value specified in TLV174/TLV20. As shown, message 514 includes the new value for the retransmission number for the ertPS service flow. Message 514 may be received at transceiver 215, and subsequently, processed by processor 225, such that TLV174 (e.g., stored in memory 230) is updated with the new value (e.g., equal to two) for the maximum retransmission number for the ertPS service flow of the associated MS 130. Upon reconfiguration, BS 110, via transceiver 215, may transmit DSA-RSP message 516 to MS 130 indicating that the new ertPS service flow has been created with the newly configured maximum retransmission number equal to two (as referred to in label 522).

The exchange of messages 520, 522 between MS 130 and BS 110 with encoded parameter "no TLV174" may indicate a request and response to create a new BE service flow with no dynamic change in the maximum retransmission number for the BE service flow operational with MS 130. Accordingly, as shown in label 524, the maximum retransmission number for the BE service flow remains unchanged equal to four, as indicated in TLV174 of UCD message 512.

In one embodiment, the process of dynamically configuring the maximum retransmission number (i.e., changing the standard-defined number to a predetermined number) for one or more specific service flows of a particular user (MS 130) may be initiated by BS 110, instead of MS 130. Accordingly, a dynamic configuration message may be transmitted from transceiver 215 to the user or MS 130 of which a service flow's retransmission number is to be changed. The dynamic configuration message from BS 110 may include the new value with which the service flow's maximum retransmission number is updated.

Turning now to FIG. 6, the exemplary flowchart of process 600 illustrates a generalized embodiment of the technique for initial configuring (for service flows and control messages) and subsequent reconfiguring (for one or more service flows of an associated user) of the maximum retransmission number, e.g., as carried out by apparatus 200 (as discussed with regard to FIGS. 3 and 4). Process 600 starts at step 610, and proceeds to step 620 in which, processor 225 configures one or more first maximum retransmission numbers that indicate a maximum number of retransmissions related to respective one or more service flows operational with the base station. Processor 225 may configure the first maximum retransmission numbers, e.g., in TLV20 of DCD 310, 410 and/or in TLV174 of UCD 312, 412 in a bit-map format, based on respective one or more first predetermined (or operator-defined) values.

At step 630, processor 225 configures a second maximum retransmission number that indicates a maximum number of retransmissions related to control messages (e.g., MAC management messages) transmitted by BS 110. Processor 225 may configure the second maximum retransmission number, e.g., in TLV20 of DCD 310, 410 and/or in TLV174 of UCD 312, 412 in a bit-map format, based on a second predetermined value.

At step 640, transceiver 215 may receive (or transmit) a dynamic configuration message, e.g., message 418, from MS 130 based on which processor 225 may reconfigure (at step 650) at least one of the one or more first maximum retransmission numbers of the associated user (i.e., from MS 130) to a third predetermined value. In one embodiment, the dynamic configuration message includes the third predetermined value. Finally, process 600 ends at step 660.

Refer now to FIG. 7, the exemplary flowchart of process 700 illustrates a generalized embodiment of the technique for configuring the maximum retransmission number (to a value other than the standard-defined value) for one or more service flows of an associated user (MS 130), e.g., as carried out by apparatus 200 (as discussed with respect to FIG. 5). Process 700 starts at step 710, and proceeds to step 720 in which, transceiver 215 may receive (or transmit) one or more dynamic configuration messages, e.g., message 514, from MS 130 to configure one or more first maximum retransmission numbers (each related to a respective service flow) for MS 130. At step 730, processor 225, e.g., based on the dynamic configuration messages, configures the first maximum retransmission numbers per one or more first predetermined values. In one embodiment, the dynamic configuration messages, e.g., message 514, include the first predetermined values. In one embodiment, in process 700, the maximum retransmission number for MAC management messages remains unchanged, i.e., equal to the standard-defined value. Process 700 ends at step 740.

Further, the above processes may be implemented as computer instructions embodied on a physical, tangible (i.e., non-transitory) computer-readable medium which, when executed by a processor, e.g., processor 225, in or otherwise associated with BS 110, carries out the functionality of the embodiments described above.

In addition, over-the-air provisioning of software updates and/or data updates from a base station to a device (or subscriber station) may be made along the lines of the embodiments discussed above.

Those with skill in the art will appreciate that the inventive concept described herein may work with various system configurations. In addition, various embodiments of this disclosure may be made in hardware, firmware, software, or any suitable combination thereof. As discussed above, various aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

Various embodiments may be described herein as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A method of configuring a number of retransmissions for an automatic repeat request scheme implemented in a wireless network, the method comprising:

configuring, using a processor operatively associated with a base station, one or more first maximum retransmission numbers based on respective one or more first predetermined values, wherein the one or more first maximum retransmission numbers each indicates a maximum number of retransmissions related to a service flow that is operational between a user and the base station, wherein the one or more first maximum retransmission numbers are configured independent of a second maximum retransmission number that indicates a maximum number of retransmissions related to control messages transmitted in the wireless network.

2. The method of claim 1, further comprising configuring, using the processor, the second maximum retransmission number based on a second predetermined value.

3. The method of claim 2, wherein the second maximum retransmission number remains static at least during a communication session between a user and the base station.

4. The method of claim 2, wherein at least one of the one or more first maximum retransmission numbers or the second maximum retransmission number is configured as part of an uplink configuration of the wireless network.

5. The method of claim 2, wherein at least one of the one or more first maximum retransmission numbers or the second maximum retransmission number is configured as part of a downlink configuration of the wireless network.

6. The method of claim 2, wherein the one or more first maximum retransmission numbers and the second maximum retransmission number are configured as part of a hybrid automatic repeat request (HARQ) scheme associated with the base station.

7. The method of claim 2, wherein at least one of the one or more first maximum retransmission numbers or the second maximum retransmission number is configured within a configuration message associated with the base station.

8. The method of claim 7, wherein at least one of the one or more first maximum retransmission numbers or the second maximum retransmission number is configured in the configuration message in a bit-map format.

9. The method of claim 1, further comprising reconfiguring at least one of the one or more first maximum retransmission numbers of an associated user to a third predetermined value, wherein the associated user, in operation, is in communication with the base station.

10. The method of claim 9, wherein at least one of the one or more first predetermined values or the third predetermined value is associated with a Quality of Service (QoS) requirement for a particular application type.

11. The method of claim 10, wherein the particular application type is a delay-constrained application, an application having a minimum data rate requirement, or an application having a minimum jitter requirement.

12. The method of claim 9, further comprising, receiving, at the base station, a dynamic configuration message,
wherein the at least one of the one or more first maximum retransmission numbers of the associated user is reconfigured based on the dynamic configuration message.

13. The method of claim 12, wherein the dynamic configuration message includes the third predetermined value.

14. The method of claim 9, further comprising, transmitting, from the base station, a dynamic configuration message,
wherein the at least one of the one or more first maximum retransmission numbers of the associated user is reconfigured based on the dynamic configuration message.

15. The method of claim 14, wherein the dynamic configuration message includes the third predetermined value.

16. The method of claim 1, wherein said configuring includes configuring the one or more first maximum retransmission numbers for an associated user, wherein the associated user, in operation, is in communication with the base station.

17. The method of claim 16, wherein the one or more first maximum retransmission numbers of the associated user are configured based on one or more dynamic configuration messages received at or transmitted from the base station.

18. The method of claim 17, wherein at least one of the one or more dynamic configuration messages includes at least one of the one or more first predetermined values.

19. The method of claim 1, wherein the base station comprises a 3G base station.

20. The method of claim 19, wherein the 3G base station comprises a CDMA/EvDO base station.

21. The method of claim 1, wherein the base station comprises a 4G base station.

22. The method of claim 21, wherein the 4G base station comprises a WiMAX base station.

23. The method of claim 21, wherein the 4G base station comprises an LTE base station.

24. The method of claim 1, wherein the control messages include media access control (MAC) management messages.

25. An apparatus for configuring a number of retransmissions for an automatic repeat request scheme implemented in a wireless network, the apparatus comprising:
a transceiver configured to transmit and receive data over the wireless network;
a memory device configured to store one or more predetermined values; and
a processor operatively coupled to the memory device and the transceiver, wherein the processor is arranged to:
configure one or more first maximum retransmission numbers based on respective one or more first predetermined values, wherein the one or more first maximum retransmission numbers each indicates a maximum number of retransmissions related to service flow that is operational between a user and the transceiver,
wherein the one or more first maximum retransmission numbers are configured independent of a second maximum retransmission number that indicates a maximum number of retransmissions related to control messages transmitted in the wireless network.

26. The apparatus of claim 25, wherein the processor is further arranged to configure the second maximum retransmission number based on a second predetermined value.

27. The apparatus of claim 26, wherein the second maximum retransmission number remains static at least during a communication session between a user and the transceiver.

28. The apparatus of claim 26, wherein the processor is further arranged to configure at least one of the one or more first maximum retransmission numbers or the second maximum retransmission number as part of an uplink configuration of the wireless network.

29. The apparatus of claim 26, wherein the processor is further arranged to configure at least one of the one or more first maximum retransmission numbers or the second maximum retransmission number as part of a downlink configuration of the wireless network.

30. The apparatus of claim 26, wherein the processor is further arranged to configure the one or more first maximum retransmission numbers and the second maximum retransmission number as part of a hybrid automatic repeat request (HARQ) scheme operational in the wireless network.

31. The apparatus of claim 26, wherein the processor is further arranged to configure at least one of the one or more first maximum retransmission numbers or the second maximum retransmission number within a configuration message.

32. The apparatus of claim 31, wherein the processor is further arranged to configure at least one of the one or more first maximum retransmission numbers or the second maximum retransmission number within the configuration message in a bit-map format.

33. The apparatus of claim 25, wherein the processor is further arranged to reconfigure at least one of the one or more first maximum retransmission numbers of an associated user to a third predetermined value, wherein the associated user, in operation, is in communication with the transceiver.

34. The apparatus of claim 33, wherein the transceiver is further configured to receive a dynamic configuration message, and the processor is further arranged to reconfigure the at least one of the one or more first maximum retransmission numbers of the associated user based on the dynamic configuration message.

35. The apparatus of claim 34, wherein the dynamic configuration message includes the third predetermined value.

36. The apparatus of claim 33, wherein the transceiver is further configured to transmit a dynamic configuration message, and the processor is further arranged to reconfigure the at least one of the one or more first maximum retransmission numbers of the associated user based on the dynamic configuration message.

37. The apparatus of claim 36, wherein the dynamic configuration message includes the third predetermined value.

38. The apparatus of claim 25, wherein the processor is further arranged to configure the one or more first maximum retransmission numbers for an associated user, wherein the associated user, in operation, is in communication with the transceiver.

39. The apparatus of claim 38, wherein the transceiver is further configured to receive or transmit one or more dynamic configuration messages, and the processor is further arranged to configure the one or more first maximum retransmission numbers of the associated user based on the one or more dynamic configuration messages.

40. The apparatus of claim 39, wherein at least one of the one or more dynamic configuration messages includes at least one of the one or more first predetermined values.

41. A non-transitory computer-readable medium comprising computer-readable instructions physically embodied thereon which, when executed by a processor arranged in a base station capable of operating in wireless network, cause the processor to carry out the functions of:
   configuring one or more first maximum retransmission numbers for an automatic repeat request scheme based on respective one or more first predetermined values, wherein the one or more first maximum retransmission numbers each indicates a maximum number of retransmissions related to a service flow that is operational between a user and the base station,
   wherein the one or more first maximum retransmission numbers are configured independent of a second maximum retransmission number that indicates a maximum number of retransmissions related to control messages transmitted in the wireless network.

42. The computer-readable medium of claim 41, further comprising computer-readable instructions that, when executed, cause the processor to carry out the functions of configuring the second maximum retransmission number based on a second predetermined value.

43. The computer-readable medium of claim 41, further comprising computer-readable instructions that, when executed, cause the processor to carry out the functions of reconfiguring at least one of the one or more first maximum retransmission numbers of an associated user to a third predetermined value, wherein the associated user, in operation, is in communication with the base station.

44. The computer-readable medium of claim 41, wherein said configuring includes configuring the one or more first maximum retransmission numbers for an associated user, wherein the associated user, in operation, is in communication with the base station.

45. A memory for storing data for access by an application program being executed by a processor arranged in a base station capable of operating in wireless network, the memory comprising:
   a data structure stored in said memory, said data structure including information related to uplink configuration or downlink configuration of the base station and accessed by the application program,
   wherein at least a part of said data structure is arranged in a bit-map format such that at least a first bit of the part of said data structure is configured based on a first predetermined value to indicate a maximum number of retransmissions in an automatic repeat request scheme related to a service flow that is operational between a user and the base station, and at least a second bit of the part of said data structure is configured based on a second predetermined value to indicate a maximum number of retransmissions in an automatic repeat request scheme related to control messages transmitted in the wireless network.

* * * * *